Patented May 14, 1946

2,400,188

UNITED STATES PATENT OFFICE 2,400,188

ACID ANTHRAQUINONE DYESTUFF

Curt Bamberger, Buffalo, N. Y., assignor to Allied Chemical & Dye Corporation, New York, N. Y., a corporation of New York No Drawing. Application January 11, 1943, Serial No. 472,005

4 Claims. (Cl. 260—372)

This invention relates to acid anthraquinone dyestuffs. It relates more particularly to acid anthraquinone dyestuffs which are derivatives of 1,4-diamino-anthraquinone-2-sulfonic acid in which a hydrogen atom of the 4-amino group is replaced by an amino-aryl radical, and to a process of making such dyestuffs.

The dyestuffs of the present invention are derivatives of 1,4-diamino-anthraquinone-2-sulfonic acid in which a hydrogen atom of the 4-amino group is replaced by a nuclear carbon atom of a methyl or ethyl ester of an N-alkylated carbanilic acid. They include the free sulfonic acids and salts which, in the form of the sodium salts, correspond with the following formula:

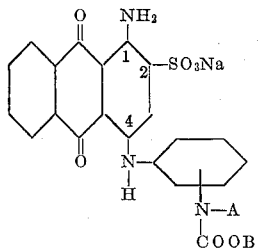

wherein A represents a radical selected from the group consisting of acylic hydrocarbon radicals, alicyclic hydrocarbon radicals, hydroxy-substituted acyclic and alicyclic hydrocarbon radicals, and alkoxy-substituted acyclic and alicyclic hydrocarbon radicals; and B represents an esterifying alkyl radical having not more than 2 carbon atoms (a methyl or ethyl radical). Preferably the N-alkylated carbanilic acid ester is attached to the 4-amino nitrogen atom of the diamino-anthraquinone sulfonic acid radical through a nuclear carbon atom which is in para-position to the nitrogen atom of the carbanilic radical (the radical

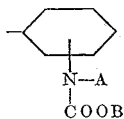

in the above formula).

In the form of their sodium salts, the dyestuffs are blue crystalline solids, soluble in water and dyeing wool (from the usual acid baths by the usual dyeing procedures for acid anthraquinone dyestuffs) various shades of blue which are fast to light and possess greater leveling power than the derivatives of 1,4-diamino-anthraquinone-2-sulfonic acid in which an aminophenyl radical replaces a hydrogen atom of the 4-amino group. Those dyestuffs which are methyl esters of the carbanilic acid derivatives possess greater leveling power than the dyestuffs which are ethyl esters. The dyestuff which is the methyl ester of the N-methyl carbanilic acid derivative has outstanding leveling properties.

The dyestuffs of the present invention can be prepared by condensing a 1-amino-4-halogen-anthraquinone-2-sulfonate with an amino N-alkylated carbanilic methyl or ethyl ester with the aid of a copper condensation catalyst.

In the production of the dyestuffs of the present invention in accordance with a preferred method of procedure, the methyl or ethyl ester of an amino N-alkylated carbanilic acid is reacted with an alkali metal salt of 1-amino-4-brom-anthraquinone-2-sulfonic acid (so called "bromamine acid") in an aqueous reaction mixture containing urea, an acid binding agent and a copper salt of the type usually employed in condensation reactions of this type, preferably at a temperature of about 70° to about 75° C. The resulting dyestuff is recovered from the reaction mixture, for example by crystallization. Preferably the resulting product is purified by recrystallization. Preferably the crystallization or recrystallization procedure further includes a treatment of the dyestuff in aqueous solution with a decolorizing carbon adsorbent (such as activated charcoal) followed by removal of the adsorbent, containing impurities, from the solution of the dyestuff, and recovery of the dyestuff from the resulting solution.

One important feature of the process of the present invention involves the use of urea as a constituent of the condensation reaction mixture. By its presence, urea improves the solubility of the amino N-alkylated carbanilic ester in the reaction mixture, thus facilitating its reaction with bromamine acid.

The treatment of the dyestuff in aqueous solution with a decolorizing carbon constitutes another important feature of the process of the present invention, since it effects a purification of the dyestuff, resulting in enhanced brightness and improved dyeing properties of the product.

The invention will be illustrated by the following specific examples, but it is to be understood that it is not limited to the details thereof and that changes may be made without departing from the scope of the invention. The temperatures are in degrees centigrade and the parts are by weight unless designated as parts by volume. Where parts are by volume, the amount signifies the volume occupied by the same number of parts by weight of water at 4° C.

Example 1

Part 1.—In a suitable vessel fitted with an agitator, a mixture of 225 parts of the sodium salt of 1-amino-2-sulfo-4-bromanthraquinone (technical grade, containing 200 parts of the pure salt), 300 parts of urea, 148 parts of the methyl ester of 4-amino-methyl-carbanilic acid of the formula

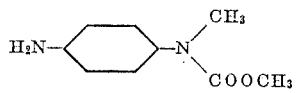

(technical grade containing 110 parts of the pure ester), 200 parts of sodium bicarbonate, and 1500 parts water was agitated for about one-half hour; then 5 parts of cuprous chloride were added and the mixture was heated to a temperature of 70° to 75°. Five portions of cuprous chloride, each weighing 2 parts, were added at about 5 minute intervals, to the solution which was agitated and maintained at 70° to 75°. After about 2 hours at that temperature, the bright blue solution began to deposit blue crystals of the resulting condensation product. At the end of about 3 hours at said temperature, a spot of the reaction mass on filter paper showed a dull-red runout without any appreciable amount of blue, indicating that little of the blue dyestuff was left in solution and that the reaction was substantially complete.

Part 2.—The reaction mass was diluted with about 3000 to about 4000 parts water, heated to about 90°, and to it 100 parts of Filter Cel were then added. After thorough agitation, the mixture was filtered, the filter cake was washed with hot water until the washings were almost colorless, and the filter cake was discarded. The washings were added to the filtrate, which contained the dyestuff in solution, and the whole was cooled to about 20°. At about 50°, the dyestuff began to crystallize and it was substantially completely out of solution at 20°. The suspension of crystals was then filtered. The filter cake of product was washed with 2% salt solution until the filtrate was practically colorless, and then dried. The resulting dyestuff was a dark solid corresponding with the formula

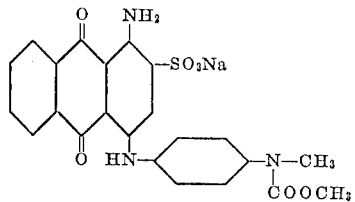

It was soluble in water to form a blue solution. From a weak acid bath it dyed wool pure, fast and exceptional level shades of blue.

Example 2

The preparation of the dyestuff was carried out in the manner disclosed in Example 1, Part 1. The resulting hot reaction mass was then cooled to 50° to 60°, to make certain that all formed dyestuff was precipitated, and the mass was then filtered, the filtrate being discarded. The filter cake of dyestuff crystals was washed with 2% salt solution until the filtrate was substantially colorless. The washed filter cake was added to about 6,000 parts of water, the aqueous mixture was heated to 90°, 40 parts of Filter Cel were added to the resulting solution, and the mixture was filtered. The filter cake was washed with hot water until the washings were almost colorless. The filtrate and washings were combined, heated to about 70°, and salted with sodium sulfite in the proportion of 2 parts per 100 parts by volume of solution. The dyestuff crystallized from the solution, and the resulting suspension was cooled to 35° to 40° and filtered. The filter cake of dyestuff crystals was washed with a cold 2% salt solution until the filtrate was substantially colorless. The resulting product had the same properties as the product of Example 1.

Example 3

50 parts of the commercial form of activated charcoal known as "Norit" were added to the hot aqueous mixture resulting from the addition of Filter Cel to the dyestuff solution in the processes of Examples 1 and 2 and the hot mixture was stirred. The resulting mixture was then filtered and the filter cake was washed with hot water until the washings were almost colorless. The combined filtrate and washings were then treated further in the manner of Examples 1 and 2 for the recovery of the final product. The resulting products gave dyeings on wool from a weak acid bath which were brighter shades of blue than the dyeings produced by the dyestuff of Examples 1 and 2.

Example 4

The ethyl ester of 4-amino-N-methyl-carbanilic acid (160 parts of the technical grade containing 117 parts of the pure salt) was condensed with the sodium salt of 1-amino-2-sulfo-4-bromanthraquinone in the manner of Examples 1 and 2. The resulting product was a dark solid corresponding with the formula:

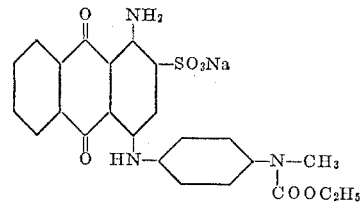

It was soluble in water to form a blue solution. From a weak acid dye bath it dyed wool in fast blue shades which were somewhat greener and not as level as the shades obtained by means of the dyestuff of Examples 1 and 2.

It will be realized by those skilled in the art that the invention is not limited to the details of the foregoing examples and that changes can be made without departing from the scope of the invention. Thus, instead of the 4-amino N-alkylated carbanilic esters employed in the above examples, other amino N-alkylated carbanilic acid methyl and ethyl esters may be employed having the following general formula:

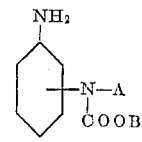

wherein A and B have the aforesaid meaning.

It is noted that the compounds included within the scope of the present invention comprise o-phenylenediamine derivatives and m-phenylenediamine derivatives, as well as p-phenylenediamine derivatives. Further, it is noted that the radicals represented by A in the above formula include acyclic hydrocarbon radicals (such as, methyl, ethyl, propyl, etc.); alicyclic hydrocarbon radicals (such as, cyclohexyl); and their hydroxy and alkoxy derivatives (such as, hydroxy-ethyl, methoxy-ethyl, ethoxy-ethyl, propoxy-ethyl and cyclohexyloxy-ethyl).

The urea employed as a component of the condensation reaction mixture may be omitted or replaced by other substances improving the solubility of the carbanilic ester, such as alcohol; but the advantages flowing from the inclusion of urea will also be absent.

Instead of adding decolorizing carbon to the solution of the dyestuff in the manner disclosed in Example 3, a purification of the dyestuff also may be effected by means of decolorizing carbon by dissolving the finished dyestuff (such as the final products of Examples 1, 2 and 4) in water, treating the resulting aqueous solution with the decolorizing carbon (e. g., "Norit"), filtering the solution while hot, and recovering the purified dyestuff from the resulting solution by salting, filtering and drying.

While the condensation is preferably carried out at temperatures of 70° to 75° C., other temperatures may be used; for example, temperatures between 45° and 100° C.

I claim:

1. A method of making acid anthraquinone dyestuffs which comprises condensing a 1-amino-4-halogen-anthraquinone-2-sulfonate with an ester of an amino N-alkylated carbanilic acid having not more than 2 carbon atoms in the esterifying alkyl radical in an aqueous reaction mixture containing urea and a copper condensation catalyst.

2. A method of making acid anthraquinone dyestuffs which comprises condensing a 1-amino-4-halogen-anthraquinone-2-sulfonate with an ester of an amino N-alkylated carbanilic acid having not more than 2 carbon atoms in the esterifying alkyl radical in an aqueous reaction mixture containing urea and a copper condensation catalyst, treating the resulting dyestuff in aqueous solution with a decolorizing carbon, separating the resulting dyestuff solution from the decolorizing carbon containing impurities, and recovering the dyestuff from the resulting solution.

3. A method of making acid anthraquinone dyestuffs which comprises heating an alkali metal salt of 1-amino-4-bromanthraquinone-2-sulfonic acid with a para-amino N-alkylated carbanilic methyl ester in a reaction mixture containing an acid binding agent, a copper salt and urea.

4. A method of making an acid anthraquinone dyestuff which comprises heating 1-amino-4-bromanthraquinone-2-sodium sulfonate with para-amino N-methyl carbanilic methyl ester in an aqueous reaction mixture containing sodium bicarbonate, a copper salt and urea.

CURT BAMBERGER.